Figure 1:
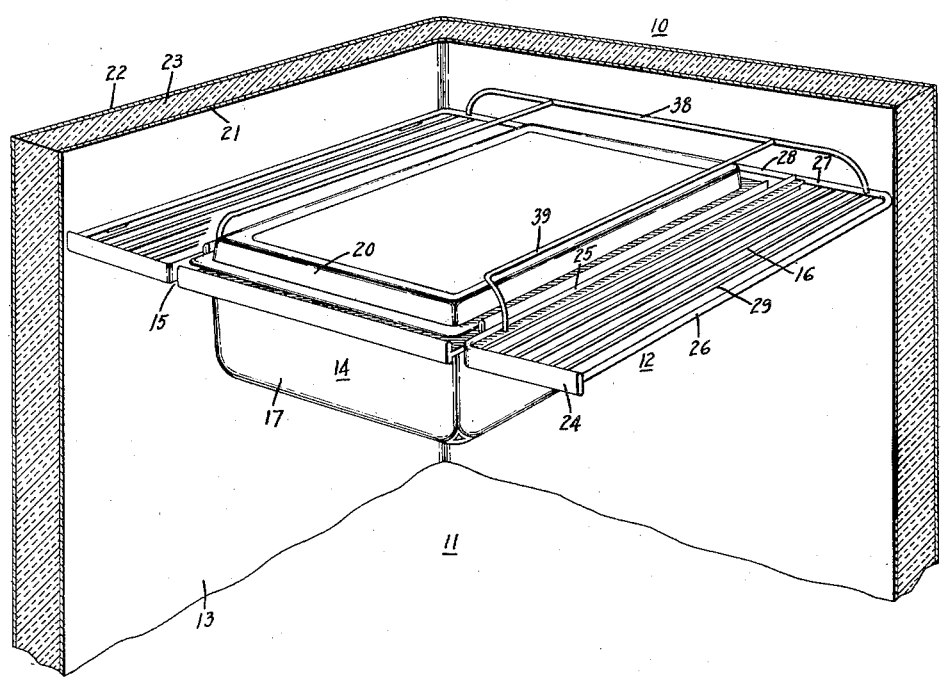

April 8, 1941.  G. S. HILL  2,237,820

FOOD STORAGE RECEPTACLE FOR REFRIGERATORS

Filed Oct. 11, 1939  2 Sheets-Sheet 1

Inventor:
George S. Hill,
by Harry E. Dunham
His Attorney.

April 8, 1941.　　　　G. S. HILL　　　　2,237,820

FOOD STORAGE RECEPTACLE FOR REFRIGERATORS

Filed Oct. 11, 1939　　　2 Sheets-Sheet 2

Inventor:
George S. Hill,
by Harry E. Dunham
His Attorney.

Patented Apr. 8, 1941

2,237,820

UNITED STATES PATENT OFFICE 2,237,820

FOOD STORAGE RECEPTACLE FOR REFRIGERATORS

George S. Hill, Erie, Pa., assignor to General Electric Company, a corporation of New York Application October 11, 1939, Serial No. 298,964

9 Claims. (Cl. 62—89)

My invention relates to refrigerators, and more particularly to food storage receptacles associated with the refrigerating compartment of refrigerators for preserving meats, vegetables and the like.

The refrigerated compartment of a household refrigerator is usually maintained at an average temperature between 40° F. and 45° F. for general refrigeration purposes. An average temperature within this range may be maintained in the refrigerated compartment by the convection currents of air set up therein by a refrigerant evaporator located in the upper portion of the refrigerated compartment. In the usual refrigerator this result is obtained by maintaining the temperature of the surface of the evaporator considerably below 32° F., for example, approximately 20° F. During the operation of the refrigerator the evaporator removes a considerable amount of the moisture in the air circulated in the refrigerated compartment, which appears upon the surface of the evaporator in the form of frost, resulting in the maintenance of an atmosphere in the refrigerated compartment having a low relative humidity, often as low as 40 per cent. While a storage atmosphere having a temperature within the range mentioned and a relative humidity as low as 40 per cent is satisfactory for the preservation of some foods, certain types of foods such, for example, as green vegetables and meats may be more satisfactorily preserved in a storage atmosphere having a lower temperature and a higher relative humidity. For example, I have found a storage atmosphere having a temperature of approximately 36° F. and a relative humidity of approximately 95 per cent to be satisfactory for the preservation of green vegetables, and a storage atmosphere having a temperature of approximately 36° F. and a relative humidity of approximately 85 per cent to be satisfactory for the preservation of meats. When green vegetables are stored in an atmosphere having the preservation conditions above set forth, they retain their crispness and remain in an unwilted condition for a considerable period of time. Likewise, when fresh meats are stored in an atmosphere having the preservation conditions above set forth, they retain substantially their original moisture content and remain in a good condition for a considerable period of time.

In the past it has been proposed to arrange variable ventilating openings so that different degrees of ventilation may be provided for different foods, such receptacles being designed for average load conditions, i. e. average amounts of food. However, I have found tha. for any given type of food as meat, for example, different degrees of ventilation are desirable according to the amount of that food placed in the receptacle. If meat is the food to be stored, I find that a receptacle designed for adequate ventilation with an average load provides too much ventilation for light loads as a small steak, for example, so that there is a tendency to dry out the meat under such conditions. On the other hand, such an arrangement does not provide enough ventilation for heavy loads as large roasts, so that slime mold or fungus growth is promoted because of the excessive moisture within the receptacle.

It is an object of my invention to provide a new and improved construction and arrangement of a food storage receptacle in the refrigerated compartment of a refrigerator whereby substantially the temperature and relative humidity set forth above are obtained.

A further object of my invention is to provide a food storage receptacle for the refrigerated compartment of a refrigerator having an arrangement for varying the preservation conditions of the air within the receptacle according to the weight of the food in the receptacle.

Further objects and advantages of my invention will become apparent as the following description proceeds, and the features of novelty which characterize my invention will be pointed out with particularity in the claims annexed to and forming a part of this specification.

Figure 2:
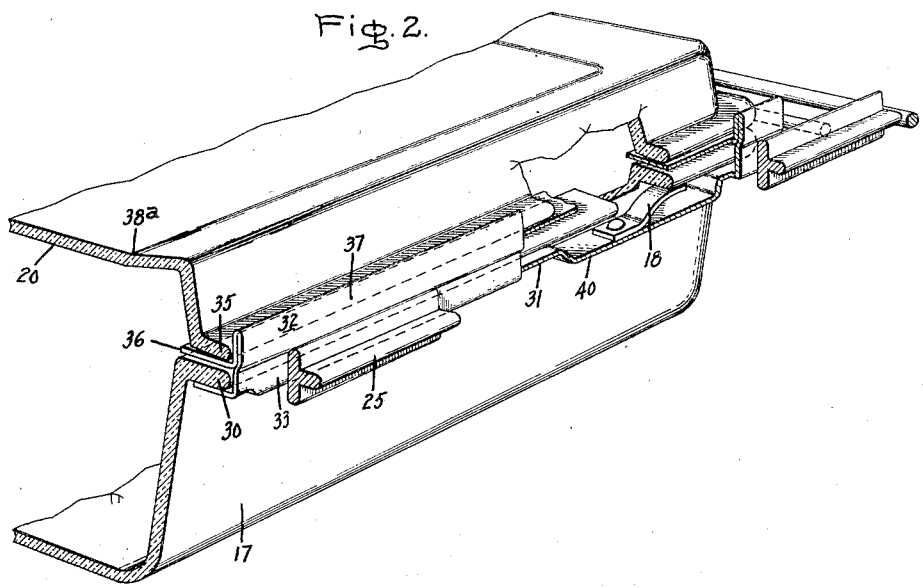
Figure 3:
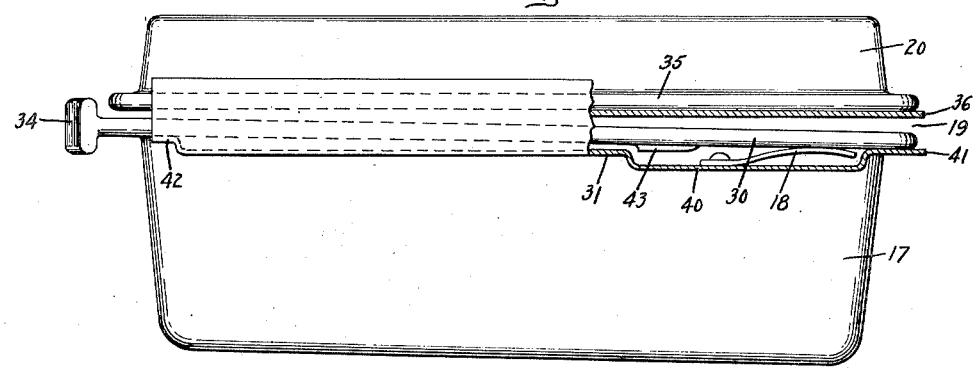

For a better understanding of my invention reference may be had to the accompanying drawings, in which Fig. 1 is a perspective view of a portion of a refrigerator provided with a food storage receptacle embodying my invention; Fig. 2 is an enlarged fragmentary perspective view of the food storage receptacle and associated parts shown in Fig. 1; and Fig. 3 is a side view of the food storage receptacle shown in Fig. 1 illustrating the operation of the automatic ventilating means.

Referring to the drawings I have shown a portion of a household refrigerator 10 having a heat-insulated refrigerated compartment 11 adapted to be cooled by a conventional evaporator. Since the cabinet and refrigerating machinery, including an evaporator, may be conventional, is it believed unnecessary to illustrate them. In the illustrative form of my invention, I have shown a shelf 12 supported on side walls 13 of the refrigerator cabinet 10 in order to support removably a food storage receptacle 14 in a space 15 provided between food supporting portions 16 of the shelf 12, the receptacle shown being of a

outside of said receptacle according to the weight of the food placed within said receptacle.

2. A food storage receptacle constructed and arranged to provide ventilation for the interior thereof, resilient means associated with said receptacle, said resilient means being operated by changes in the weight of material placed in said receptacle for varying the amount of ventilation between the inside and outside of said receptacle according to the weight of the food placed within said receptacle.

3. In a refrigerator having a refrigerated compartment, a food storage receptacle, means providing ventilation for said receptacle, said receptacle being so constructed and arranged that the weight of the material placed therein causes operation of said means for varying the amount of ventilation between the interior of said receptacle and said compartment according to the weight of the food placed within said receptacle.

4. In a refrigerator having a refrigerated compartment, a food storage receptacle, said receptacle being constructed and arranged for providing ventilation for the interior thereof, resilient means associated with said receptacle, said resilient means being operated by the weight of the material placed in said receptacle for varying the amount of ventilation between the interior or said receptacle and said compartment according to the weight of the food placed within said receptacle.

5. In a refrigerator having a refrigerated compartment, a food storage receptacle in said compartment, said receptacle having a lower open-topped member and a cover member, means for providing a ventilating space between said members, and means associated with one of said members for varying the extent of said space in order to vary the amount of ventilation between the interior of said receptacle and said compartment, said means being constructed and arranged to be operated according to the weight of the food placed within said lower member.

6. In a refrigerator having a refrigerated compartment, a food storage receptacle in said compartment, said receptacle having a lower open-topped member and a cover member, means for maintaining portions of said members in spaced relationship thereby providing ventilation for said receptacle, and means for varying the space between said portions according to the weight of the food placed within said receptacle.

7. In combination with a refrigerator having a refrigerated compartment, a food storage receptacle in said compartment, said receptacle having a lower open-topped member and a cover member, a shelf in said compartment having an opening therein arranged to receive said receptacle and said cover in spaced relationship, and resilient means carried by said shelf and engaging said lower member for assisting in the support of said receptacle in said opening whereby the space between said cover and said lower member is varied according to the weight of said lower member and its contents.

8. In combination with a refrigerator having a refrigerated compartment, a food storage receptacle in said compartment, said receptacle having a lower open-topped member and a cover member, means for supporting said receptacle including opposed members, each of said opposed members having a longitudinally extending upper flange for supporting said cover and a longitudinally extending lower flange for supporting said receptacle, said flanges being spaced apart in order to provide a ventilating space between said members, means for varying the extent of said space according to the weight of said lower member and is contents, and means for supporting said opposed members.

9. In combination with a refrigerator having a refrigerated compartment, a food storage receptacle in said compartment, said receptacle having a lower open-topped member and a cover member, means for supporting said receptacle including opposed members, each of said opposed members having a longitudinally extending upper flange for supporting said cover and a longitudinally extending lower flange for supporting said receptacle, said flanges being spaced apart in order to provide a ventilating space between said members, resilient means interposed between said lower flange and said lower member for varying the extent of said space according to the weight of said lower member and its contents, and means for supporting said opposed members.

GEORGE S. HILL.